(12) United States Patent
Wengierow

(10) Patent No.: US 12,242,228 B2
(45) Date of Patent: Mar. 4, 2025

(54) SYSTEMS AND METHODS FOR HOLOGRAPHIC PROJECTION

(71) Applicant: Envisics Ltd, Milton Keynes (GB)

(72) Inventor: Michal Wengierow, Milton Keynes (GB)

(73) Assignee: Envisics Ltd., Milton Keynes (GB)

( * ) Notice: Subject to any disclaimer, the term of this patent is extended or adjusted under 35 U.S.C. 154(b) by 523 days.

(21) Appl. No.: 17/671,710

(22) Filed: Feb. 15, 2022

(65) Prior Publication Data

US 2023/0116373 A1    Apr. 13, 2023

(30) Foreign Application Priority Data

Feb. 24, 2021  (GB) ...................................... 2102613

(51) Int. Cl.
| | | |
|---|---|---|
| *G09G 3/00* | (2006.01) | |
| *G03H 1/00* | (2006.01) | |
| *G03H 1/08* | (2006.01) | |
| *G03H 1/22* | (2006.01) | |

(52) U.S. Cl.
CPC ......... *G03H 1/2294* (2013.01); *G03H 1/0005* (2013.01); *G03H 1/0808* (2013.01); *G03H 1/2205* (2013.01); *G09G 3/00* (2013.01); *G03H 2001/0088* (2013.01); *G03H 2226/02* (2013.01); *G03H 2240/62* (2013.01)

(58) Field of Classification Search
None
See application file for complete search history.

(56) References Cited

U.S. PATENT DOCUMENTS

| | | | | |
|---|---|---|---|---|
| 11,765,328 | B2* | 9/2023 | Christmas | H04N 9/3141 |
| | | | | 348/744 |
| 2017/0109882 | A1* | 4/2017 | Case | A61B 6/03 |
| 2021/0195146 | A1* | 6/2021 | Christmas | H04N 9/3105 |

FOREIGN PATENT DOCUMENTS

| | | |
|---|---|---|
| GB | 2498170 A | 10/2013 |
| GB | 2501112 A | 10/2013 |
| GB | 2578523 A | 5/2020 |

(Continued)

OTHER PUBLICATIONS

Search Report / Written Opinion in EPO Application 22155229.2 (Year: 2024).*

(Continued)

*Primary Examiner* — Tyler W. Sullivan
(74) *Attorney, Agent, or Firm* — Akerman LLP

(57) ABSTRACT

A holographic system comprises an image processor, a hologram calculator and a display driver. The image processor is arranged to determine first and second secondary images by sampling the pixel values of a primary image at a regular array of sampling positions. The hologram calculator is arranged to determine a hologram of each secondary image. The display driver is arranged to display each hologram in rapid succession on a display device, first and second times, so as to reconstruct each secondary image from the respective hologram such that respective first and second arrays of image pixels corresponding to the primary image are perceivable. Image pixels of the reconstruction of the second secondary image are interposed between image pixels of the reconstruction of the first secondary image in the first direction.

20 Claims, 12 Drawing Sheets

Reconstruction 1

Reconstruction 2

Interlaced reconstruction

(56) References Cited

FOREIGN PATENT DOCUMENTS

GB        2586512 A    2/2021

OTHER PUBLICATIONS

Combined Search and Examination Report for GB 2102613.3 (Dec. 6, 2021) (12 pages).
Wang et al., "High-quality micropattern printing by interlacing pattern holographic femtosecond pulses," Nanophotonics 1010; 9(9): 2895-2904 (Jun. 17, 2020) (10 pages).
Mori et al., "Speckle reduction in holographic projection by random pixel separation with time multiplexing," Applied Optics, vol. 53, No. 35: 8182-8188 (Dec. 10, 2014) (7 pages).

* cited by examiner

| 11 | 12 | 13 | 14 | 15 | 16 | 17 | 18 |
|----|----|----|----|----|----|----|----|
| 21 | 22 | 23 | 24 | 25 | 26 | 27 | 28 |
| 31 | 32 | 33 | 34 | 35 | 36 | 37 | 38 |
| 41 | 42 | 43 | 44 | 45 | 46 | 47 | 48 |

Source image

| 11 | 0  | 13 | 0  | 15 | 0  | 17 | 0  |
|----|----|----|----|----|----|----|----|
| 0  | 22 | 0  | 24 | 0  | 26 | 0  | 28 |
| 31 | 0  | 33 | 0  | 35 | 0  | 37 | 0  |
| 0  | 42 | 0  | 44 | 0  | 46 | 0  | 48 |

Secondary image 1

| 0  | 12 | 0  | 14 | 0  | 16 | 0  | 18 |
|----|----|----|----|----|----|----|----|
| 21 | 0  | 23 | 0  | 25 | 0  | 27 | 0  |
| 0  | 32 | 0  | 34 | 0  | 36 | 0  | 38 |
| 41 | 0  | 43 | 0  | 45 | 0  | 47 | 0  |

Secondary image 2

H1

Hologram 1

H2

Hologram 2

SYSTEMS AND METHODS FOR HOLOGRAPHIC PROJECTION

CROSS-REFERENCE TO RELATED APPLICATIONS

This application claims priority under 35 U.S.C. § 119 to UK Patent Application GB 2102613.3, titled "Holographic Projection," filed on Feb. 24, 2021. The entire contents of GB 2102613.3 are incorporated by reference herein for all purposes.

FIELD

The present disclosure relates to a projector and an image processor. More specifically, the present disclosure relates to a holographic projector, a holographic projection system and an image processor for holographic projection. The present disclosure further relates to a method of holographically projecting a target image and a method of holographically projecting video images. Some embodiments relate to a head-up display.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and head-mounted displays, "HMD", including near-eye devices, for example.

A holographic projector projects an image onto a replay field on a replay plane. When using the described technology, the projected image is formed from a hologram displayed on pixels of the SLM, herein referred to as "SLM pixels". Thus, the SLM pixels display pixels of the hologram, herein referred to as "hologram pixels". The projected image is formed of "image spots" which are also referred to herein as "image pixels". The image pixels are a consequence of the holographic process. A hologram is calculated from a pixelated image for projection. The image pixels have a finite size and adjacent image pixels in the replay field can interfere or blur together. This is referred to herein as pixel crosstalk. The problem of pixel crosstalk leads to reduced image quality.

The resolution of the projected image may be a measure of the number of image pixels formed at the replay field. The resolution may be also be referred to herein as the spatial resolution, the density of image spots or the fill factor. For high quality images, it is desirable to form closely packed image pixels, and thus high-resolution images. Some applications require a replay field having a high aspect ratio, for example for the projection of "widescreen" video images. For example, the replay field may have an aspect ratio of 16:9 or 2:1. However, the replay field is typically square, which may present a challenge to the formation of high-resolution images with a high aspect ratio.

A hologram calculator takes time to determine a hologram for display from a source image. For example, the hologram may be a Fourier hologram calculated using at least one Fourier transform. The time taken to calculate the hologram can therefore limit the rate at which holograms can be written to the SLM and thus the rate at which a sequence of source images can be projected as a video stream, herein called the "frame rate". Thus, it can be difficult to project images at acceptable video frame rates.

The present disclosure concerns techniques for implementing time interlacing to optimise the resolution of the holographic reconstruction of a source image on the replay plane. In particular, the disclosed techniques may be used to form a high-resolution image on a replay field having a high aspect ratio.

There is disclosed herein an improved holographic projection system and method.

SUMMARY

Aspects of the present disclosure are defined in the appended independent claims.

There is disclosed herein holographic system. The system comprises an image processor, a hologram calculator and a display driver. The image processor is arranged to determine a plurality of secondary images from a primary image. Each secondary image is formed by sampling the pixel values of the primary image at a plurality—e.g. regular array—of sampling positions. A first secondary image is formed by sampling using a regular array of first sampling positions and a second secondary image is formed by sampling using a regular array of second sampling positions. The hologram calculator is arranged to determine a hologram of each secondary image. The display driver is arranged to display each hologram in rapid succession on a display device so as to reconstruct each secondary image from the respective hologram such that a first array of image pixels, substantially corresponding to the primary image, is perceivable. An aperture of the display device is rectangular and is orientated such that it is longer in the second direction than the first direction. The aperture of the display device is defined by the shape of the display, such as the shape of the array of pixels of the display device. Thus, the image pixels formed there-from are more elongate and closely-packed in the first direction than the second direction. The display driver is further arranged to display each hologram in rapid succession on a display device for a second time so as to reconstruct each secondary image from the respective hologram such that a second array of image pixels is perceivable. The second array of the image pixels is translated in the second direction with respect to the first array of image pixels in order that the second array of the image pixels interpose the first array of image pixels in the second direction.

The rectangular aperture of the display device is longer in the second direction (e.g. y direction) than the second direction (e.g. x direction). In consequence of the diffractive effect of the aperture, the image pixels that form the reconstruction of each secondary image at the replay plane are longer in the first direction (e.g. x direction) than the second direction (e.g. y direction). In particular, the image pixels are "stretched" and become more elongate in the first direction and shorter in the second direction. The increased length of image pixels in the first direction means that the image pixels may be more closely packed in the first direction. It may be said that the spacing between image pixels in the first direction may be reduced. The closeness of the packing may be limited by pixel crosstalk effects that degrade image quality. This close packing of image spots increases the resolution of the images formed at the replay plane in the first direction. However, the reduced length of image pixels in the second direction means that the image pixels may be less closely packed in the second direction. It may be said that the spacing between image pixels in the second direction may be increased. This increased spacing between image pixels in the second direction reduces the resolution of the image pixels in the second direction, and gaps may appear between image pixels in the second direction. This may adversely affect image quality.

In order to compensate for this, in accordance with the present disclosure, each hologram is displayed in rapid succession for a second time, so as to reconstruct each secondary image from the respective hologram but translated in the second direction. Thus, a second array of image pixels, substantially corresponding to the primary image, is perceivable, which replicates the first array of image pixels. The second array of the image pixels is translated in the second direction with respect to the first array of image pixels in order that the second array of the image pixels interpose the first array of image pixels in the second direction. Thus, the second array of image pixels fill in the gaps between the first array of image pixels in the second direction. It may be said that the image pixels of the second array of image pixels extends the spot size of the image pixels of the first array of image pixels in the second direction (e.g. y direction). In particular, each image pixel of the second array of image pixels may appear to merge with the corresponding image pixel of the first array of image pixels to form a "combined" or "dual" image pixel that is double the length in the second direction. In some embodiments, each combined image pixels is perceived as generally symmetrical in the first and second directions. The replication of the composite reconstruction of the secondary images, corresponding to the primary image, increases the number of image pixels formed in the second direction (e.g. y direction). Thus, the image pixels are more closely packed in the second direction. Accordingly, the image resolution (i.e. density of image spots or fill factor) is increased in the second direction as well as the first direction, thereby improving image quality. As the skilled person will appreciate, this replication of the composite reconstruction of the primary image is achieved by doubling the number of displayed holograms/secondary images (or "sub-frames") per primary image (or "image frame").

In embodiments, the first and second sampling positions are interposed in a first direction to form lines of alternating first and second sampling positions in the first direction. The first and second sampling positions are aligned in the second direction, perpendicular to the first direction, so that the lines of alternating first and second sampling positions in the first direction are aligned in the second direction. In particular, the regular array of first sampling positions used to form the first secondary image is a first pattern of alternating sampling positions in the first direction, and the regular array of second sampling positions used to form the second secondary image is a second pattern of alternating sampling positions in the first direction. The second pattern is opposite (i.e. inverse or complementary) to the first pattern. First image pixels of the reconstruction of the first secondary image and second image pixels of the reconstruction of the second secondary image are interposed in the first direction (e.g. x direction) but aligned in the second direction (e.g. y direction). Thus, the composite reconstruction corresponding to the primary image comprises lines of alternating first and second image pixels in the first direction having pixels values respectively sampled using the first and second sampling positions in the first direction.

In embodiments, the second array of image pixels is translated in the second direction with respect to the first array of image pixels by means of a phase-ramp or grating function. For example, a second direction grating function may be added to each hologram for the second time compared to the first time. Alternatively, a different grating function may be used when displaying each hologram for the second time compared to the first time. As the skilled person will appreciate, other embodiments may implement alternative techniques for translating the second array of image pixels in the second direction with respect to the first array of image pixels, such as mechanical techniques for so-called "beam steering".

Accordingly, a first sequence of holograms, corresponding to a plurality of secondary images generated from a primary image, is displayed in rapid succession on an SLM to form corresponding holographic reconstructions that combine to form a composite holographic reconstruction corresponding to the primary image on a replay plane. The first sequence of holograms is displayed during a first part of a time period for displaying a frame (i.e. frame interval). In addition, a second sequence of the plurality of holograms is displayed in rapid succession on the SLM to form corresponding holographic reconstructions that combine to form a replica composite holographic reconstruction corresponding to the primary image. The second sequence of holograms is displayed with a different grating function from the first sequence of holograms, so that the replica composite holographic reconstruction is translated in the second direction on the replay plane compared to the original composite holographic reconstruction.

In some embodiments, a third secondary image is formed by sub sampling using a regular array of third sampling positions and a fourth secondary image is formed by sub sampling using a regular array of fourth sampling positions. The third and fourth sampling positions are interposed in the first direction to form lines of third and fourth sampling positions in the first direction. The third and fourth sampling positions are aligned in the second direction. The lines of first and second sampling positions and the lines of third and fourth sampling positions are evenly interposed in the first direction and second direction.

In embodiments, each secondary image comprises fewer pixels than the primary image. In embodiments, each pixel of the primary image corresponds to only one secondary image such that the secondary images are combinable in order to fully form a composite representation of the primary image.

In embodiments, the rectangular aperture corresponds to the perimeter of an array of pixels of the display device. The image pixels of each holographic reconstruction may be longer in the short dimension of the rectangular aperture/display device. In consequence, in embodiments, the image pixels are more-closely packed in the short dimension of the rectangular aperture/display device than the long dimension thereof. Accordingly, each hologram may be displayed for the second time with a translation in the long direction of the rectangular aperture/display device in order to at least partially compensate for the elongation of the image pixels caused by the rectangular aperture.

In embodiments, each hologram is displayed on the display device and illuminated in rapid succession such that a plurality of image pixels is formed on a display plane at substantially the same time or within the integration time of the human eye. Thus, the viewer perceives the combined or composite reconstruction corresponding to the primary image.

In embodiments, each secondary image is square. In particular, the image processor is arranged to determine each secondary image using a square array of sampling positions so that each secondary image comprises a square array of pixel values.

In embodiments, the array of image pixels formed on the replay field during the display of a primary image or frame is rectangular with a high aspect ratio. For example, the aspect ratio may be 16:9 or 2:1. This is advantageous for the formation of widescreen images or for the display of images in certain applications such as automotive applications in which the windscreen has a landscape or widescreen orientation.

The approach disclosed herein provides significant technical contributions to the field. Firstly, the quality of the projected image is improved. Secondly, the speed at which the projected image can be updated (i.e. the frame rate) is increased. Thirdly, the resolution of the projected image is increased (e.g. for high aspect ratio images). These technical contributions are explained respectively in the following paragraphs.

First, the approach disclosed herein enables pixel crosstalk to be managed by displaying different image pixels at different times. More specifically, different groups of image pixels are displayed at different times. For example, a first holographic reconstruction formed at a first time (corresponding to a first secondary image) may comprise a first group of image pixels (e.g. every other image pixel in a first direction) of a frame and a second holographic reconstruction at a second time (corresponding to a second secondary image) may fill in the gaps between image pixels in the first direction by displaying a second group comprising the remaining image pixels. Since image pixels of the first and second groups (e.g. adjacent pixel groups) are not displayed at the same time, interpixel interference and pixel crosstalk is reduced. Similarly, a replica first holographic reconstruction formed at a third time may comprise a third group of image pixels of a frame and a replica second holographic reconstruction formed at a fourth time may comprise a fourth group of image pixels of the frame, where the third and fourth groups of image pixels together fill in the gaps between image pixels in the second direction. The inventors have therefore disclosed a technique of interlacing (in time) a plurality of holographic reconstructions to improve image quality by managing pixel crosstalk.

In the present disclosure, the new approach is implemented by under-sampling a high-resolution source image in a plurality of different ways to obtain a respective plurality of secondary images. Thus, it is possible to achieve a desired resolution of the composite or interlaced holographic reconstructions by "upscaling" the target image to form a source image, and under-sampling the source image or an intermediate image based on the source image, whilst managing pixel crosstalk.

In some embodiments, a target image for projection is "upscaled" to form a source image having an increased number of pixels. Thus, the resolution (in terms of the number of pixels) is increased. The upscaling of an image may increase the number of pixels by a power of two, since the number of pixels is multiplied in both the x- and y-directions. For instance, an image may be upscaled by 4 in the x- and y-directions. For example, each individual pixel may be replicated in a 4×4 array of pixels (i.e. with the same pixel value) in the upscaled image. In consequence, an image comprising an n×m array of pixels is "upscaled" or "over-sampled" to obtain a 4n×4m array of pixels forming an oversampled or upscaled version of the image. The over-sampled/upscaled image may be used as the source image (or primary image) as described below. More complex methods of upscaling the target image may be used.

Secondly, the inventors have disclosed herein an approach which is suitable for real-time (i.e. video rate) processing. Specifically, the holograms can be determined and displayed within the frame time of video. This technical contribution is achieved because each secondary image has fewer pixels than the source image. Although more holograms are required for each source image, each individual hologram can be determined much quicker. For example, it is quicker to calculate two holograms comprising x pixels using a Fourier transform method than it is to calculate one hologram comprising 2x pixels. The inventors have therefore disclosed a technique to increase the speed of calculating holograms corresponding to a source image to enable holographic projection at acceptable video frame rates.

Thirdly, the inventors have disclosed herein an approach which increases the resolution (i.e. density of image spots or fill factor) of projected images. In addition, the approach may be used to achieve images having a high aspect ratio (e.g. 16:9 or 2:1). In particular, by time multiplexing subframes of secondary images, and aligning or interleaving the image pixels formed by the corresponding reconstructions, the image perceived by the viewer has a higher fill factor and thus a higher resolution.

These and other advantages of the new approach disclosed herein will be further appreciated from the following detailed description.

The term "target image" is used herein to reference to the input to the holographic system described herein. That is, the target image is the image that the holographic system is required to project onto a holographic replay plane. The target image may be one image of a sequence of images such as a video-rate sequence of images.

The term "primary image" is used herein to refer to an image derived from the target image. The primary image may be the same as the target image or an upscaled version of the target image or another type of intermediate image derived from the target image. When the primary image is an upscaled version of the target image, the primary image comprises more pixels than the target image. Any upscaling technique may be employed. In some embodiments, upscaling comprises repeating pixel values of the target image, as described herein. In these embodiments, a processor may use a simple mapping scheme to represent the repeating.

The term "secondary image" is used herein to refer to one of a plurality of images derived from the primary image. Each secondary image is formed by sub-sampling (also referred to as "under-sampling") the primary image. Each secondary image comprises fewer pixels than the source image. The pixel values of the secondary images described herein are derived by sampling the pixels values of the primary image at a regular array of sampling positions, such as a checkerboard array or other pattern of sampling positions. Notably, when the primary image is an upscaled version of the target image, the upscaling process used to form the primary image is different to the sub-sampling technique used to form each secondary image from the primary image. The secondary images are each different to the primary image but, optionally, they may have the same number of pixels. A hologram corresponding to each secondary image is calculated.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

For simplicity, in the following description, references to the display by a display device, such as a spatial light modulator (SLM), of a "hologram" is intended to include the display of a diffractive pattern comprising the hologram combined with a grating and/or lens function.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
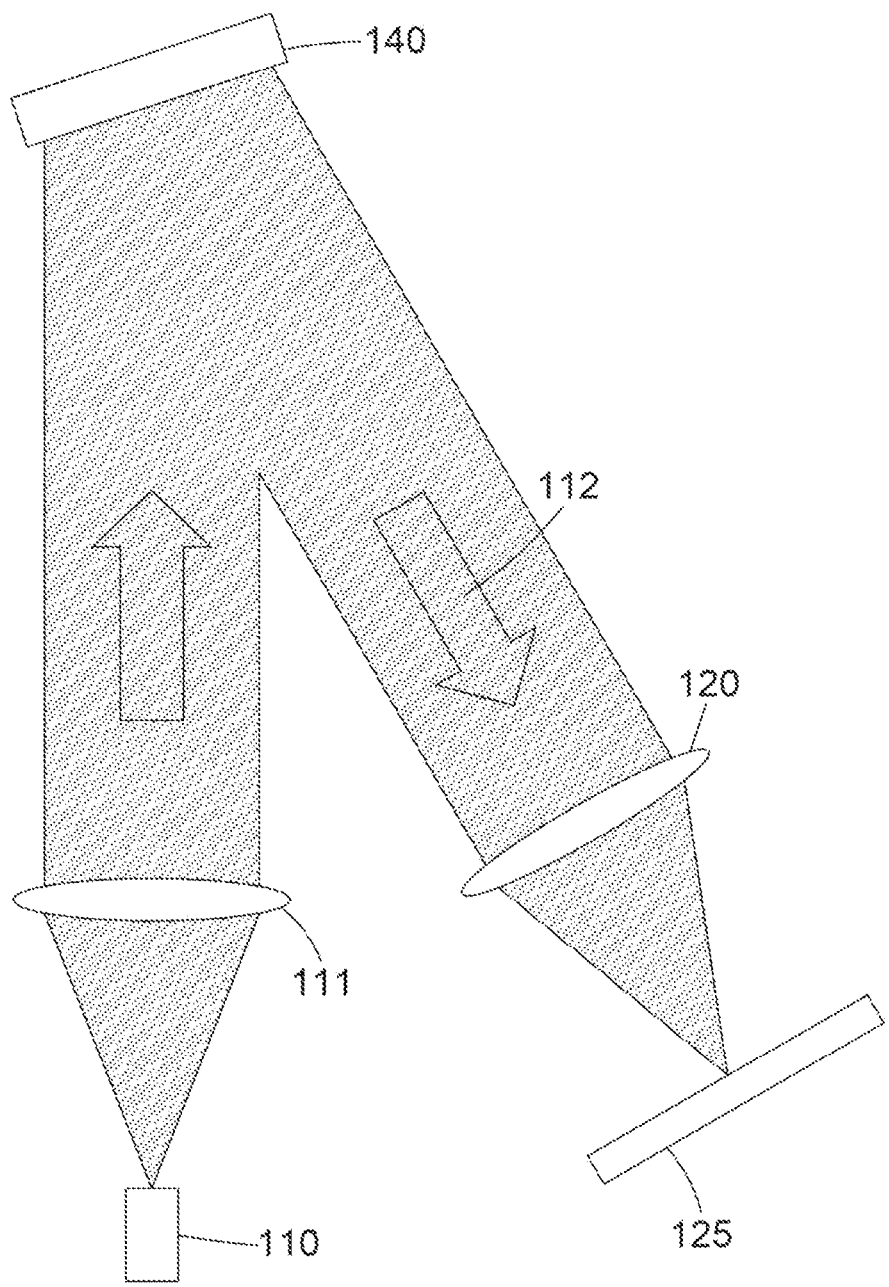
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer).

However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information T[x, y], wherein the amplitude information T[x, y] is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
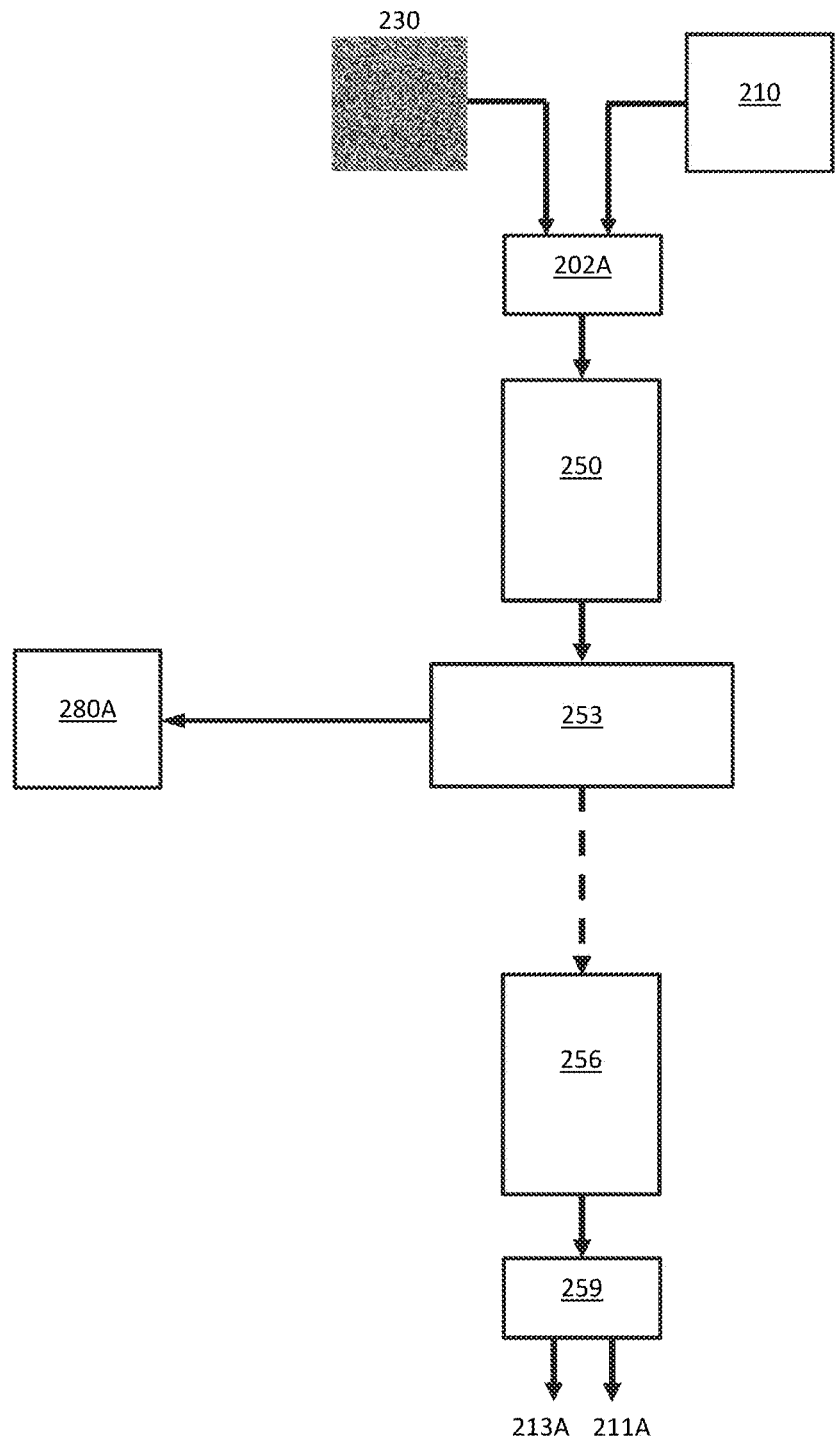
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 210 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
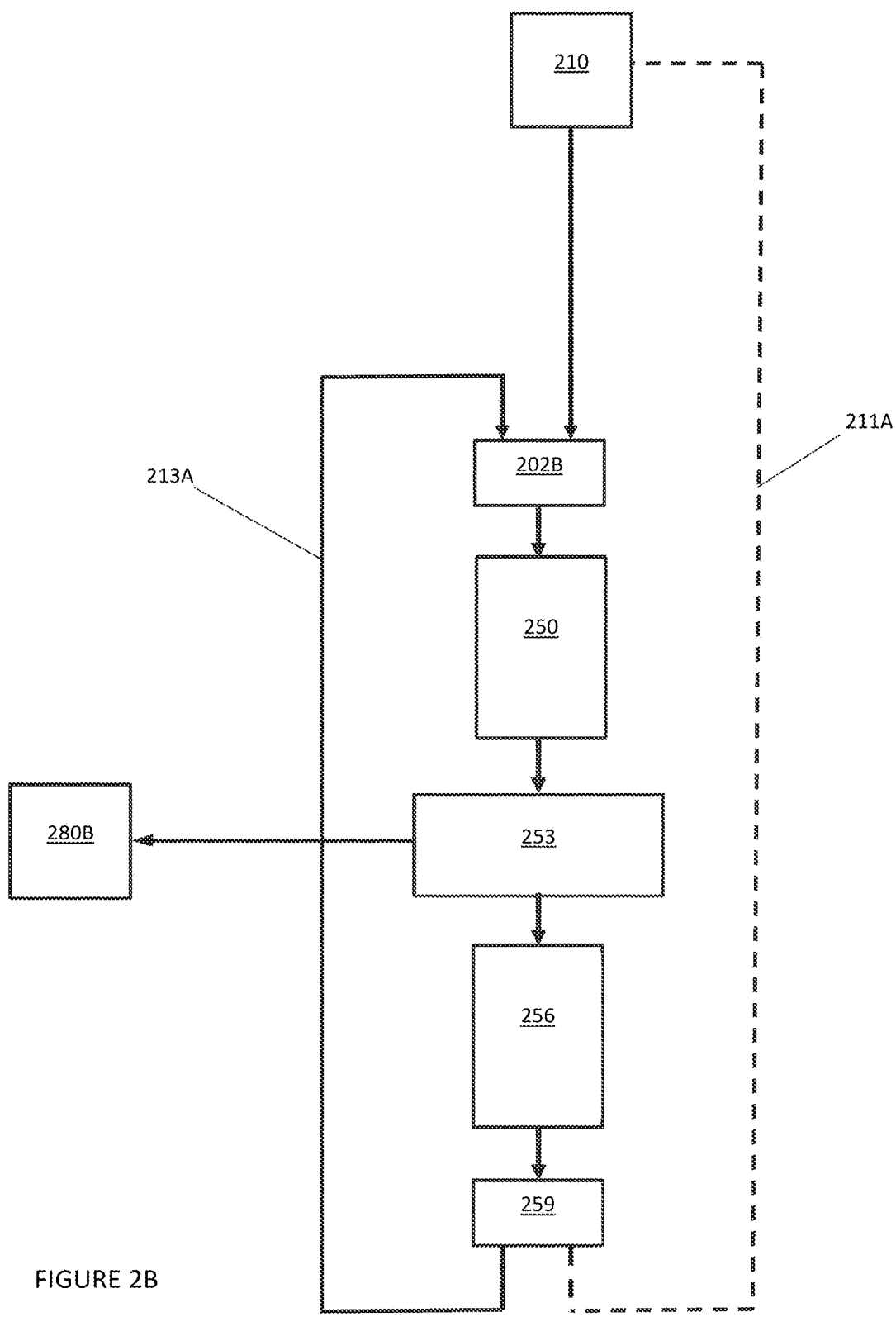
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
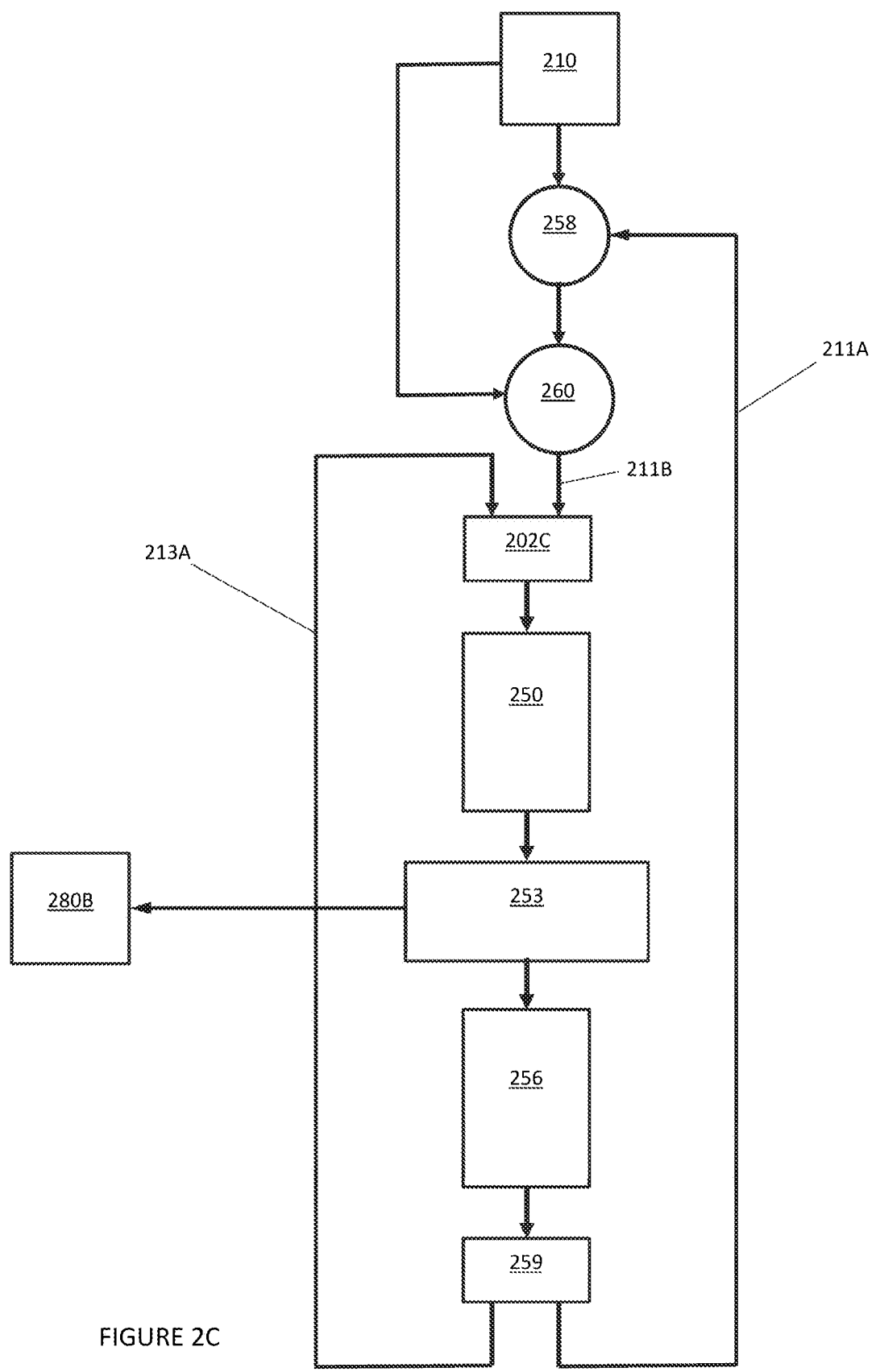
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm to the data forming step 202C of FIG. 2C. The distribution of magnitude values 211A is rejected in favour of an alternative distribution of magnitude values. In this alternative embodiment, the alternative distribution of magnitude values is derived from the distribution of magnitude values 211A of the previous iteration. Specifically, processing block 258 subtracts the distribution of magnitude values of the input image 210 from the distribution of magnitude values 211A of the previous iteration, and scales that difference by a gain factor α. Then, at processing block 260, the algorithm subtracts the scaled difference (determined at processing block 258) from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta\cdot\exp(i\angle R_n[x,y])\}$$

$$\eta=T[x,y]-\alpha(|R_n[x,y]-T[x,y]|)$$

where:
F' is the inverse Fourier transform;
F is the forward Fourier transform;
R[x, y] is the complex data set output by the third processing block 256;
T[x, y] is the input or target image;
∠ is the phase component;
Ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time processor arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
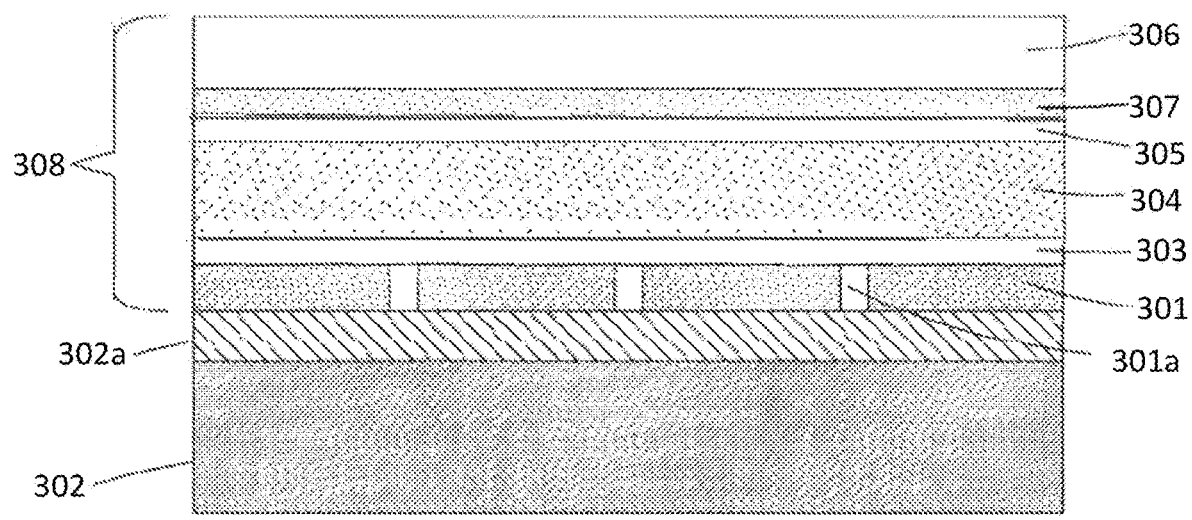
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the gap 301a between pixels. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Sampling Using Arrays of Sampling Positions

Figure 4:
FIG. 4 shows an example technique for determining a pair of holograms from respective first and second secondary images derived from a primary image for projection, in accordance with embodiments.
Figure 4:
Figure 4:
Figure 4:

FIG. 4 shows an example technique for determining a pair of holograms H1 and H2 from respective secondary images 1 and 2 derived from a primary image in accordance with embodiments. In this example, the primary image is a high-resolution source image, which may be an upscaled version of a target image as described herein. The following description refers to the source image (rather than the primary image) for simplicity.

Referring to FIG. 4, an example source image (shown at the top of the drawing) comprising an 4×8 array of image pixels is processed (e.g. by an image processor) to generate a pair of secondary images 1 and 2 (shown in the middle of the drawing) based on an array of sampling positions arranged in a "checkerboard" layout or pattern. First secondary image 1 is generated using an array of first sampling positions in a first checkerboard pattern. Thus, first secondary image 1 is generated by sampling the pixels values of every other image pixel of the source image in the first checkerboard pattern and filling the remaining pixels with a "zero". The terms "sampling" and "sub-sampling" are used interchangeably throughout this disclosure to mean the same thing. The prefix "sub" is merely used sometimes to emphasise that the output image (i.e. the secondary image) has fewer pixels than the input image (i.e. the primary or source image). Thus, secondary image 1 includes the image pixel values from the source image at locations (1, 1), (1, 3) ... (2, 2), (2, 4) ... (3, 1), (3, 3) ... and (4, 2) ... (4, 8). Second secondary image 2 is generated using an array of second sampling positions in a second checkerboard pattern that is opposite or inverse to the first checkerboard pattern. Thus, the array of second sampling positions sub-sample the opposite, inverse or complementary image pixels of the source image to the array of first sampling positions. Thus, secondary image 2 is generated by sub sampling the pixel values of every other image pixel of the source image in the second checkerboard pattern that is opposite to (i.e. the inverse of) the first checkerboard pattern and filling the remaining pixels with a "zero". Thus, secondary image 2 includes the image pixel values from the source image at locations (1, 2), (1, 4) ... (2, 1), (2, 3) ... (3, 2), (3, 4) ... and (4, 1) ... (4, 7).

Accordingly, it may be said that the first secondary image 1 is generated by sub sampling the pixel values of the source image at a regular array of sampling positions corresponding to the first checkerboard pattern and zeroing the other (un-sampled) pixel values, and the second secondary image 2 is generated by sub sampling the pixel values of the primary image at a regular array of sampling positions corresponding to the second, opposite checkerboard pattern and zeroing the other (un-sampled) pixel values.

Each of secondary images 1 and 2 is then processed (e.g. by a hologram calculator) to determine a corresponding hologram H1, H2 (shown at the bottom of the drawing). Any suitable method may be used to calculate the hologram, such as the algorithms described above.

In the illustrated example, sampling using arrays of sampling positions in a checkerboard pattern (i.e. sub sampling using an array of sampling positions corresponding to a checkerboard pattern) is performed by sampling individual pixel values of the source image. As the skilled person will appreciate, this may be extended to sampling groups or clusters of pixel values of the source image (e.g. using sampling window and/or kernel and the like) using an array of sampling positions corresponding to a checkerboarding pattern. Examples of the sampling of groups or clusters of pixel values of the source image are described in co-pending UK patent application No. GB1912168.0 filed 23 Aug. 2019, the disclosure of which is herein incorporated by reference. In addition, the skilled person will appreciate that the pattern of sampling positions does not need to take the form of a checkerboard pattern or layout. On the contrary, the pattern of sampling positions used in each array of sampling positions may be chosen according to the desired number and spatially interlacing of image pixels to be formed at the replay plane to reproduce the primary image.

Figure 5:
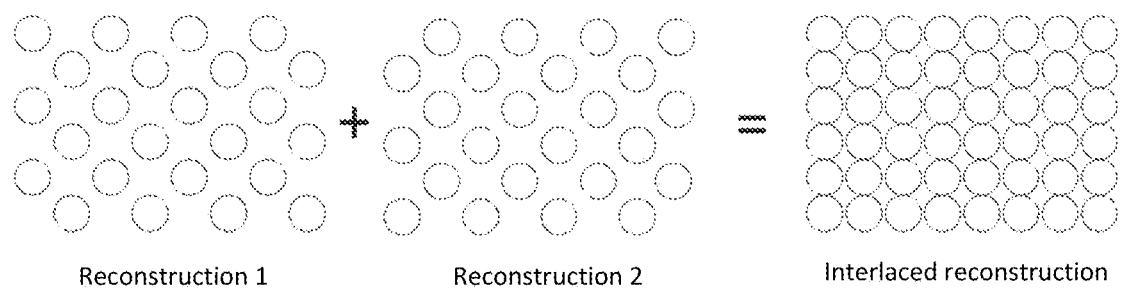
FIG. 5 shows holographic reconstructions produced by sequentially displaying a pair of holograms, based on a generalisation of the example technique of FIG. 4, in accordance with embodiments.

FIG. 5 shows holographic reconstructions produced by sequentially displaying holograms H1 and H2 based on a generalisation of the example technique shown in FIG. 4.

In particular, FIG. 5 shows a subset of image pixels formed by a first holographic reconstruction of a first hologram H1 (shown in FIG. 4) corresponding to first secondary image 1 (shown on the left-hand side of the drawing in FIG. 4), in a first checkerboard pattern. FIG. 5 shows a subset of image pixels formed by a second holographic reconstruction of a second hologram H2 (shown in FIG. 4) corresponding to second secondary image 2 (shown in the middle of the drawing in FIG. 4), in a second checkerboard pattern, which is the opposite or inverse of the first checkerboard pattern. First secondary image 1 in FIG. 4 is derived by sampling the pixels of a source image with the first checkerboard pattern (e.g. sampling odd-numbered pixels in odd-numbered rows and even-numbered pixels in even-numbered rows), and zeroing out the other (un-sampled) pixels. Second secondary image 2 in FIG. 4 is derived by sampling the pixels (or groups/clusters of pixels) of the source image with the second checkerboard pattern (e.g. sampling even-numbered pixels in odd-numbered rows and odd-numbered pixels in even-numbered rows), and zeroing out the other (unsampled) pixels. FIG. 5 further shows the combined or composite holographic reconstruction appearing to the viewer by forming the first and second holographic reconstructions, in turn, within the integration time of the human eye (shown on the right-hand side of the drawing in FIG. 5). In the composite holographic reconstruction shown in FIG. 5, the image pixels of the first and second holographic reconstructions are spatially interlaced on the replay field. In particular, the image pixels of the second holographic reconstruction are diagonally interlaced with the image pixels of the first holographic reconstruction. Thus, the image pixels of the second holographic reconstruction fill in the gaps between the image pixels of the first holographic reconstruction. This may be referred to as "checkerboarding" or "diagonal interlacing".

By using the above approach of sub sampling alternate image pixels of the source image in accordance with a checkerboard pattern, the spacing between the image pixels (or "image pixels") of each individual holographic reconstruction shown in FIG. 5 is increased by a factor or two by reducing the number of hologram pixels in H1 and H2. It can be said that the spatial resolution of each holographic reconstruction (i.e. density of image pixels in the replay field) is reduced by a factor of two. The two holographic reconstructions can be interlaced together by using (e.g. adding) a phase-ramp or software grating function, as described herein, to translate one of the holographic reconstructions relative to the other such that the image pixels of one reconstruction fill the gaps between image pixels of the other reconstruction. This is advantageous because it helps prevents any overlap between adjacent image pixels (i.e. it reduces or prevents "pixel crosstalk"). As described above, the overlapping of adjacent image pixels or image pixels can produce interference which appears as grain/noise to the viewer. Furthermore, by time interlacing the display of the first and second holograms H1 and H2—forming the first and second holographic reconstructions in turn rather than at the same time—this interference can be minimised.

In embodiments, each of the holograms H1 and H2 may be sequentially written to, and thus displayed on, the SLM at a speed that is sufficiently fast that the corresponding holographic reconstructions are formed within the integration time of the human eye. For ease of description, it may be said that each of the holograms H1, H2 is displayed on the SLM "in rapid succession". In particular, the holograms H1, H2 corresponding to the plurality of secondary images are sequentially displayed on the SLM within a time period corresponding to a frame ("a frame interval"). Thus, a viewer, observing the replay field on which the holographic reconstructions are formed, sees a single projected image rather than a dynamically changing projected image corresponding to multiple holographic reconstructions formed one after the other. The projected image therefore appears to be a faithful and complete reconstruction of the source image.

As the skilled person will appreciate, whilst FIGS. 4 and 5 show generating two secondary images from the source image, it is possible to generate three or more secondary images and calculate corresponding holograms. This can be achieved using "checkerboarding" or "diagonal interlacing" by increasing the spacing (number of un-sampled pixels) between the sampled image pixels (or groups/clusters of pixels) of the source image, thereby increasing the number of checkerboard patterns or arrays of sampling positions. For example, three checkerboard patterns/arrays of sampling positions may be used, each checkerboard pattern sampling every third pixel in each row/column to generate three secondary images from the source image, and so on.

Accordingly, secondary images may be generated by sub sampling a source image using N arrays of sampling positions arranged in a checkerboard-type pattern so as to sub sample every Nth image pixel. Thus, each sampling position within an array of sampling positions is spaced from adjacent sampling positions within the array by (N-1) pixels. When using "checkerboarding" or "diagonal interlacing" the sampling positions in each array are spaced apart by (N-1) pixels in both the x and y directions to form a checkerboard-type pattern that is symmetrical in both the x and y directions. However, variations of this approach include arrays in which the pixel spacing between sampling positions is different in the x and y directions. Examples are described herein and disclosed in co-pending patent application GB1912168.0 supra.

The "sampling" (or "sub sampling") approach described above can be used together with any suitable technique for generating a plurality of secondary images from a primary or source image.

As the skilled person will recognise, the display of each hologram corresponding to a secondary image of a primary image by the SLM, may be considered as a subframe of a frame, where the frame displays the primary image within a frame interval. The number of subframes per frame is dependent on the number of holographic reconstructions (or replay images) that are time interlaced (or time multiplexed) together in the composite image. In embodiments, the number of subframes may be the same as the number of secondary images/holograms.

An "interlacing scheme" may define the sub sampling scheme used to derive a plurality or secondary images from a primary image corresponding to a target image for projection. The interlacing scheme may further define the order or sequence of display of the holograms or subframes corresponding to the plurality of secondary images. Finally, the interlacing scheme may define the spatial interlacing—that is the relative position or displacement—of the image pixels of the holographic reconstructions, which is controlled by a phase-ramp or software grating function, as described herein.

As the skilled person will appreciate, the spatial interlacing of the holographic reconstructions formed by the subframes corresponding to the secondary images results in the composite holographic reconstruction at the replay field, which should correspond to the primary image or frame. Thus, the sub sampling scheme (i.e. the arrays of sub sampling positions and type of sub sampling of pixels) used to generate the secondary images from the primary image are chosen according to the desired resolution and spatial interlacing of image pixels of the subframes formed in a frame interval to reproduce the primary image.

COMPARATIVE EXAMPLE

Figure 6:
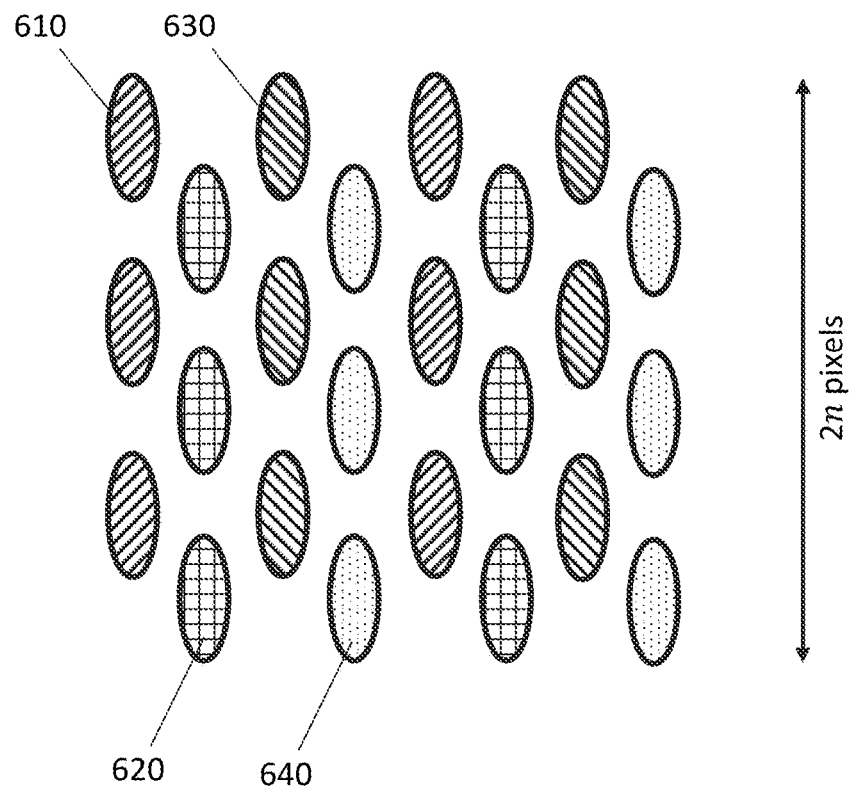
FIG. 6 shows a composite image formed by respective arrays of image pixels of holographic reconstructions of a plurality of holograms determined from corresponding secondary images derived from a primary image for projection, in accordance with a comparative example.

FIG. 6 shows a subset of image pixels of a composite holographic reconstruction of a plurality of holograms of a comparative example. In the comparative example, the display device is rectangular in a conventional "landscape" configuration (i.e. longer in the x direction than the y direction). FIG. 6 shows subsets of four sets of image pixels 610, 620, 630, 640 of respective holographic reconstructions of holograms corresponding to four secondary images derived from a primary image for projection. Thus, the interlacing scheme comprises the display of four holograms in rapid succession on the SLM, meaning there are at least four different subframes per frame. As the skilled person will appreciate, additional duplicate subframes corresponding to the four holograms may be displayed per frame where the refresh rate is sufficiently fast.

Each of the secondary images may be derived using a sub sampling approach comprising N arrays of sampling positions as described above, where N=4. In particular, each secondary image may sub sample pixel values (or groups of pixels values) of a primary image in accordance with an array of sampling positions corresponding to one of four checkerboard patterns. The checkerboard patterns of sampling positions of the array correspond to spatial interlacing of image pixels of the holographic reconstructions as shown in FIG. 6. In particular, pairs of respective holographic reconstruction are diagonally interlaced whilst image pixels of different pairs of holographic reconstructions are aligned, as described further below. Further details of the patterns of the arrays of sampling positions and are not disclosed herein. In this example, each array of sampling positions is arranged in a square array of (n×n). Each sampling position in an array is separated from adjacent sampling positions by three-pixel positions in a first direction. In other words, when sampling individual pixel values of the source image, every fourth pixel value of the primary image is sampled in the first direction to form each secondary image and the other (un-sampled) pixels are omitted from the secondary image (or zeroed out). When sampling groups of pixel values of the source image at the sampling positions, a single pixel value for the secondary image is determined from each group of pixel values. Thus, each secondary image comprises (n×n) pixels and each hologram calculated from a secondary image comprises (n×n) hologram pixels. Accordingly, each holographic reconstruction forms an array of (n×n) image pixels in the replay field.

In the comparative example of FIG. 6, as a result of diffraction due to a rectangular aperture of the display device in "landscape" orientation, the image pixels of each holographic reconstruction are longer in the second direction (i.e. y direction) than the first direction (i.e. the x direction). In addition, the image pixels of each holographic reconstruction are more closely packed in the second direction (i.e. y direction) than the first direction (i.e. x direction). Thus, in each holographic reconstruction, there are gaps between lines of image pixels extending in the second direction (i.e. y direction). For example, as shown in FIG. 6, there are horizontal gaps between adjacent columns of image pixels 610 of the first holographic reconstruction.

The spatial interlacing of the four holographic reconstructions shown in FIG. 6 results in adjacent lines of image pixels of each holographic reconstruction extending in the second direction (i.e. y direction/columns) having three lines of image pixels of the other three holographic reconstructions interposed therebetween. Thus, for example, three columns of image pixels 620, 630, 640 of the second, third and fourth holographic reconstructions are interposed between two adjacent columns of image pixels 610 of the first holographic reconstruction. However, adjacent image pixels of a line of image pixels of each holographic reconstruction extending in the first direction (i.e. x direction/ rows) have image pixels of one of the other holographic reconstructions interposed therebetween. Thus, lines of alternating image pixels of a pair of holographic reconstructions extending in the first direction (i.e. x direction) are aligned in the second direction (i.e. y direction). Thus, only one line of alternating image pixels of one pair of holographic reconstructions extending in the first direction is interposed between adjacent lines of alternating image pixels of the other pair of holographic reconstructions extending in the first direction. Thus, for example, a single row of image pixels comprising alternating image pixels 620, 640 of the second and fourth holographic reconstructions is interposed between adjacent rows of image pixels comprising alternating image pixels 610, 630 of the first and third holographic reconstructions.

As the skilled person will appreciate, the above-described spatial interlacing of image pixels of the first to fourth holographic reconstructions is consistent with the sub sampling scheme used to determine the corresponding secondary image, which is not described in detail herein. Thus, the spatial interlacing of the image pixels of the holographic reconstructions at the replay field results in the pixels of the respective secondary images being correctly positioned within the composite holographic reconstruction so as to correspond with (i.e. represent or reproduce) the primary image.

As described herein, the spatial interlacing of the image pixels of the respective first to fourth holographic reconstructions is achieved by controlling the position of holographic reconstruction on the replay plane using a phase-ramp or software grating function, for example by adding a grating function in the first direction (i.e. x direction) and a grating function in the second direction (i.e. y direction).

In consequence of the above interlacing scheme, the composite reconstruction has 4n image pixels in the first direction (i.e. x direction) and 2*n* image pixels in the second direction (i.e. y direction). This corresponds to a high aspect ratio. However, as described above, the spatially interlaced image pixels of the composite reconstruction are elongate in the second direction (i.e. y direction). Thus, the individual image pixels are not aligned with the orientation of the aspect ratio of the image pixels formed in the replay field.

First Embodiment—Interlacing Scheme Using Two Holograms

A first embodiment of the present disclosure is described with reference to FIGS. 7A and 7B. In the first embodiment, the replay field or image plane is rotated by 90 degrees in comparison to the comparative example described above. This results in image pixels of each holographic reconstruction are longer in the first direction (i.e. x direction) than the second direction (i.e. y direction). This rotation may be achieved using a rectangular aperture that is longer in the second direction (i.e. y direction) than the first direction (i.e. x direction)—e.g. a rectangular display device in "portrait" orientation.

Figure 7A:
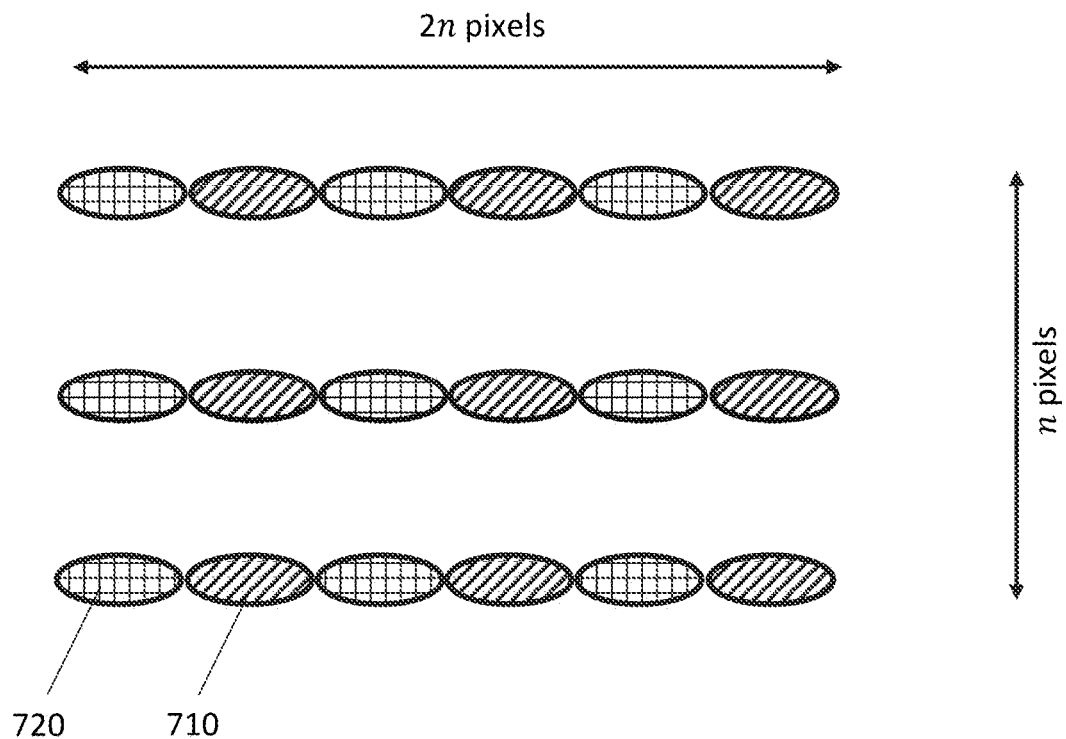
FIG. 7A shows a composite image formed by arrays of image pixels of holographic reconstructions of a pair of holograms determined from corresponding secondary images derived from a primary image for projection, in which the respective arrays of image pixels are aligned into lines of image pixels extending in a first direction.

FIG. 7A shows a subset of image pixels of a combined or composite holographic reconstruction of a plurality of holograms. In particular, FIG. 7A shows subsets of first and second sets of image pixels 710, 720 of respective first and second holographic reconstructions of holograms corresponding to first and second secondary images derived from a primary image for projection. Thus, the interlacing scheme comprises the display of the first and second holograms in rapid succession on the SLM (i.e. within a frame interval), meaning there are (at least) two subframes per frame.

Each of the secondary images may be derived by sub sampling a primary image using a regular array of sampling positions as described above. In particular, a first secondary image is generated by sub sampling a primary image using an array of first sampling positions to sub sample individual pixels or groups of pixels at first alternate pixel positions in a first direction (e.g. odd numbered pixels), and a second secondary image is generated by sub sampling the primary image using an array of second sampling positions to sub sample individual pixels or groups of pixels at the opposite or inverse alternate pixels positions in the first direction (e.g. even numbered pixels). In this example, the lines of sampling positions extending in the first direction in each array are the same. Thus, the first sampling positions and the second sampling positions are interposed in the first direction but are aligned in the second direction. This is in contrast to the sampling positions of a pair of arrays having opposite checkerboard patterns as in FIG. 5, in which the first sampling positions and the second sampling positions are interposed in both the first and second directions.

In accordance with the illustrated embodiment, each of the first and second secondary images comprises (n×n) pixels, and so each hologram comprises (n×n) hologram pixels. As described herein, holograms corresponding to the first and second secondary images are generated and displayed in rapid succession on the SLM (i.e. within a frame interval) to that first and second holographic reconstructions are formed on the reply plane. Accordingly, each of the first and second holographic reconstructions forms an array of (n×n) image pixels or image pixels in the replay field.

As described above, first image pixels of a first holographic reconstruction of a first hologram corresponding to the first secondary image are spatially interlaced-specifically interposed in the first direction or "laterally interlaced"— with second image pixels of a second holographic reconstruction of a second hologram corresponding to the second secondary image, so that the composite holographic reconstruction corresponds to the primary image. Thus, the composite holographic reconstruction of the primary image comprises an array of (2n×n) image pixels. Accordingly, the composite holographic reconstruction comprises an array of image pixels having a high aspect ratio (i.e. with more pixels in the first/x direction than the second/y direction). Moreover, the shape of the image pixels is aligned with the array of image pixels of the composite holographic reconstruction formed in the replay field.

The composite holographic reconstruction of the first and second holographic reconstructions comprises second image pixels 720 of the second holographic reconstruction interposed between first image pixels 710 of the first holographic reconstruction in the first direction (and vice versa). Thus, in the embodiment shown in FIG. 7A, the composite holographic reconstruction comprises rows of alternating first image pixels 710 and second image pixels 720. Since the image pixels 710, 720 are longer in the first direction, the separation between image pixels in the first direction is reduced. It may be said that the image pixels are more closely packed in the first direction. In addition, the lines of alternating first image pixels 710 and second image pixels 720 extending in the first direction are aligned in the second direction. Thus, the first image pixels 710 and the second image pixels 710 are not interposed in the second direction. Since the image pixels 710, 720 are shorter in the second direction, the separation between the image pixels in the second direction is increased. This leads to gaps extending in the second direction between lines of interposed image pixels 710, 720 extending in the first direction. It may be said that the image pixels are less closely packed in the second direction. Thus, in the embodiment shown in FIG. 7A, the composite holographic reconstruction comprises gaps between the aligned rows of alternating first image pixels 710 and second image pixels 720. This increased spacing in the second direction is undesirable, since it results in reduced image pixel density in the second direction, and the possible appearance of gaps, leading to reduced image quality.

The inventors disclose herein a novel interlacing scheme. In accordance with the interlacing scheme of the present disclosure, the SLM first displays a sequence of holograms corresponding to a plurality of secondary images generated from a primary image to form a composite holographic reconstruction corresponding to the primary image, and subsequently (immediately thereafter) displays the sequence of holograms to form a replica of the composite holographic reconstruction corresponding to the primary image. The replica composite holographic reconstruction is translated with respect to the original composite holographic reconstruction in the second direction on the replay plane. Thus, the disclosed interlacing scheme forms duplicate lines of image pixels extending in the first direction, which fill in the above-described gaps between lines of image pixels extending in the first direction and increase the packing density of pixels in the second direction. In particular, each image pixel of the replica composite holographic reconstruction may extend the length of the corresponding image pixels of the original composite holographic reconstruction. Since the duplicate lines of image pixels in the first direction of the replica composite holographic reconstruction are displayed at different times from the lines of image pixels in the first direction of the original composite holographic reconstruction, interpixel interference or pixel crosstalk is minimised.

Figure 7B:
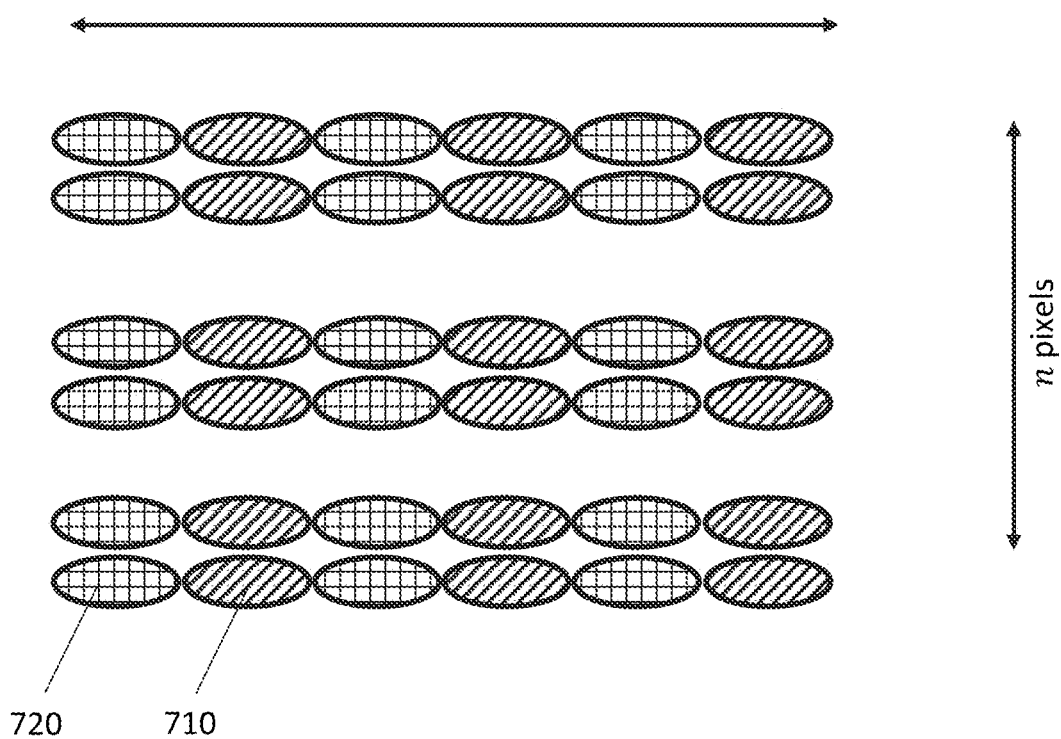
FIG. 7B shows an image formed from the composite image of FIG. 7A and a replica of the composite image of FIG. 7A that is translated in a second direction, orthogonal to the first direction, in accordance with embodiments.

FIG. 7B shows the interlacing scheme applied to the subset of image pixels of the composite holographic reconstruction of FIG. 7A. In particular, FIG. 7B shows a first composite holographic reconstruction corresponding to a primary image as in FIG. 7A, and a replica composite holographic reconstruction corresponding to the primary image, which is translated in the second direction on the replay plane.

As described above with reference to FIG. 7A, an original composite holographic reconstruction corresponding to the primary image comprises first image pixels 710 of a first holographic reconstruction of a first hologram corresponding to a first secondary image spatially interlaced with second image pixels 720 of a second holographic reconstruction of a second hologram corresponding to a second secondary image. In addition, in the first embodiment shown in FIG. 7B, a replica composite holographic reconstruction corresponding to the primary image comprises first image pixels 710 of a replica first holographic reconstruction of the first hologram corresponding to the first secondary image spatially interlaced with second image pixels 720 of a replica second holographic reconstruction of a second hologram corresponding to a second secondary image. A phase-ramp or grating function in the second direction (e.g. y-direction grating) is added to the first and second holograms written to the SLM to form the replica holographic reconstructions compared to the diffractive patterns used to form the original holographic reconstructions. Thus, as shown in FIG. 7B, the replica composite holographic reconstruction forms a duplicate row of alternating first and second image pixels 710, 720 below each of the rows of image pixels 710, 710 of the original composite holographic reconstruction shown in FIG. 7A. Thus, the resulting "dual composite holographic reconstruction" corresponding to the primary image formed by the interlacing scheme comprises an array of (2n×n) image pixels, in which the image pixels are lengthened in the second direction (i.e. y direction).

As the skilled person will appreciate, the interlacing scheme of the present disclosure leads to an increase in the number of different subframes displayed by the SLM per frame interval by a factor of two to produce the duplicate or replica composite holographic reconstruction corresponding to the primary image. Thus, in the embodiment of FIG. 7B, (at least) four different diffractive patterns corresponding to the two holograms-using two different software grating functions for each hologram—are displayed per frame instead of two, as in FIG. 7A.

As the skilled person will appreciate, the interlacing scheme of the first embodiment may be extended to an interlacing scheme in which the SLM displays more than two holograms corresponding to secondary images generated from a primary image to achieve a desired aspect ratio and packing density of image pixels.

Second Embodiment—Interlacing Scheme Using Four Holograms

A second embodiment of the present disclosure is described with reference to FIGS. 8 and 9. In the interlacing scheme in accordance with a second embodiment, the sub sampling scheme generates four secondary images from a primary image, as in the comparative example of FIG. 6. This interlacing scheme may be used to achieve an array of image pixels reconstructing the primary image that has a high-aspect ratio (i.e. more pixels in the first/x direction than the second/y direction), consistent with "widescreen" image formats.

As in the first embodiment, the replay field or image plane of the second embodiment is rotated by 90 degrees in comparison to the comparative example of FIG. 6. This results in image pixels of each holographic reconstruction are longer in the first direction (i.e. x direction) than the second direction (i.e. y direction). This rotation may be achieved using a rectangular aperture that is longer in the second direction (i.e. the y direction) than the first direction (i.e. the x direction). Thus, as described herein the shape of the image pixels (i.e. each pixel is longer in the first/x direction than the second/y direction) is aligned with the array of image pixels formed in the replay field (i.e. the array has more pixels in the first/x direction than the second/y direction).

Figure 8:
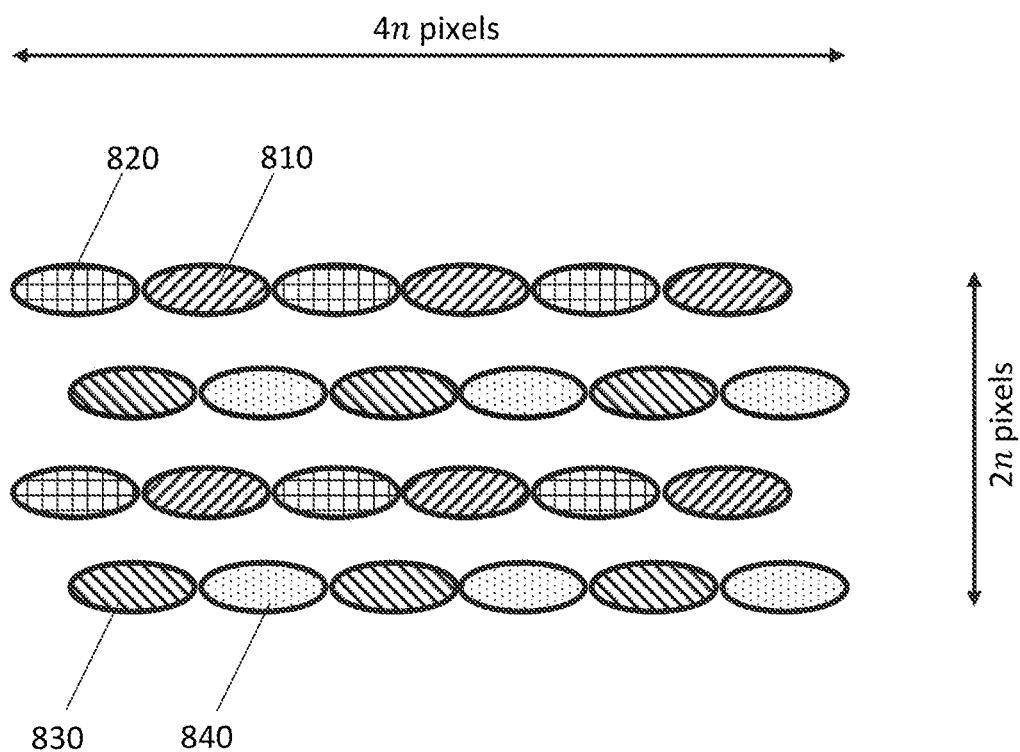
FIG. 8 shows a composite image, similar to FIG. 7A, formed by arrays of image pixels of holographic reconstructions of two pairs of holograms determined from corresponding secondary images derived from a primary image for projection, in which the respective arrays of image pixels of each pair of holograms are aligned into lines of image pixels extending in the first direction.

FIG. 8 shows a subset of image pixels of a combined or composite holographic reconstruction of a plurality of four holograms. In particular, FIG. 8 shows subsets of first to fourth sets of image pixels 810, 820, 830, 840 of respective first to fourth holographic reconstructions of holograms corresponding to first to fourth secondary images derived from a primary image for projection. Thus, the interlacing scheme comprises the display of a sequence of first to fourth holograms in rapid succession on the SLM (i.e. within a frame interval), meaning there are (at least) four subframes per frame.

Each of the first to fourth secondary images may be derived by sub sampling a primary image using a regular array of sampling positions, as described above with reference to FIG. 6. In accordance with the illustrated embodiment, each of the first to fourth secondary images comprises (n×n) pixels, and so each hologram comprises (n×n) hologram pixels. A sequence of holograms corresponding to the first to fourth secondary images is generated and displayed in rapid succession on the SLM (i.e. within a frame interval) so than the first to fourth holographic reconstructions are formed on the reply plane. Accordingly, each of the first to fourth holographic reconstructions forms an array of (n×n) image pixels in the replay field.

The spatial interlacing of the first to fourth holographic reconstructions forms a composite holographic reconstruction corresponding to the primary image as shown in FIG. 8. In particular, the composite holographic reconstruction of the first and second holographic reconstructions comprises second image pixels 820 of the second holographic reconstruction interposed between first image pixels 810 of the first holographic reconstruction in the first direction (and vice versa). In addition, the composite holographic reconstruction of the third and fourth holographic reconstructions comprises fourth image pixels 840 of the fourth holographic reconstruction interposed between third image pixels 830 of the third holographic reconstruction in the first direction (and vice versa). Thus, the dual composite holographic reconstruction comprises an array of (4n×2n) image pixels.

The composite holographic reconstruction of the third and fourth holographic reconstructions is spatially offset in the second direction compared to the composite holographic reconstruction of the first and second holographic reconstructions. Thus, the resulting (or total) composite holographic reconstruction comprises lines of alternating third image pixels 830 and fourth image pixels 840 extending in the first direction interposed between rows of alternating first image pixels 810 and second image pixels 820 extending in the first direction. Accordingly, this approach combines lateral interlacing and diagonal interlacing of image pixels. Since the image pixels 810, 820, 830 and 840 are longer in the first direction, the separation between image pixels in the first direction is reduced. It may be said that the image pixels are more closely packed in the first direction. In addition, the lines of alternating first/third image pixels and second/fourth image pixels extending in the first direction are aligned in the second direction. Since the image pixels 810, 820, 830, 840 are shorter in the second direction, the separation between the lines of image pixels in the second direction is increased. It may be said that the image pixels are less closely packed in the second direction. This leads to gaps extending in the second direction between lines of interposed image pixels extending in the first direction. Thus, in the embodiment shown in FIG. 8, the composite holographic reconstruction comprises gaps between the aligned rows of alternating first/third image pixels and second/fourth image pixels.

Figure 9:
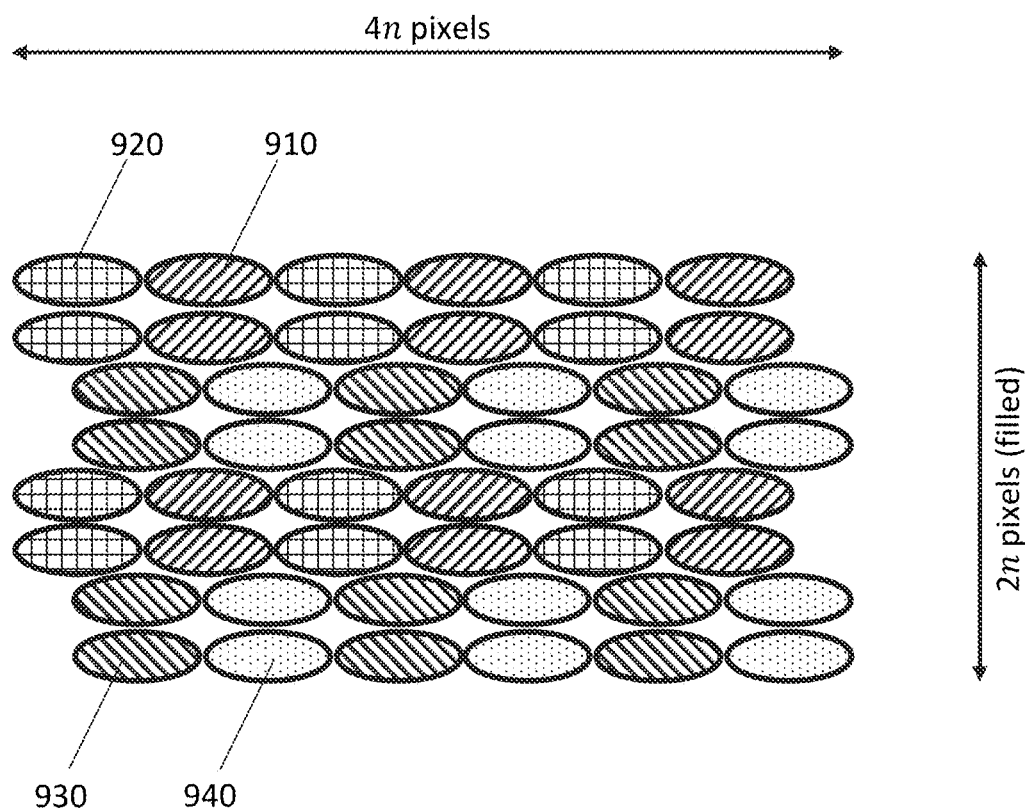
FIG. 9 shows an image formed from the composite image of FIG. 8 and a replica of the composite image of FIG. 8 that is translated in the second direction, in accordance with embodiments.

FIG. 9 shows how the novel interlacing scheme of the present disclosure is applied in the second embodiment. In particular, FIG. 9 shows a first composite holographic reconstruction comprising first to fourth holographic reconstructions corresponding to a primary image as in FIG. 8, and a replica composite holographic reconstruction comprising first to fourth holographic reconstructions corresponding to the primary image, which is translated in the second direction on the replay plane.

As described above with reference to FIG. 8, an original composite holographic reconstruction comprises lines of alternating third/fourth image pixels 830, 840 extending in the first direction interposed between lines of alternating first/second image pixels 810, 820 extending in the first direction. In addition, a replica composite holographic reconstruction comprises lines of alternating third/fourth image pixels 830, 840 extending in the first direction interposed between lines of alternating first/second image pixels 810, 820 extending in the first direction. A phase-ramp or grating function in the second direction (e.g. y-direction grating) is added to the first to fourth holograms written to the SLM to form the replica holographic reconstructions compared to the diffractive patterns used to form the original holographic reconstructions. Thus, as shown in FIG. 9, the replica composite holographic reconstruction forms a duplicate row of alternating first and second image pixels 910, 920 below each of the rows of alternating first and second image pixels 810, 820 and a duplicate row of alternating third and fourth image pixels 930, 940 below each of the rows of alternating third and fourth image pixels 830, 840 of the original composite holographic reconstruction shown in FIG. 8. Thus, the resulting "dual composite holographic reconstruction" corresponding to the primary image formed by the interlacing scheme comprises an array of (4n×2n) image pixels, in which the image pixels are lengthened in the second direction (i.e. y direction).

The novel interlacing scheme disclosed herein may be implemented by a holographic projector as described above. In particular, the display device may comprise a spatial light modulator having a rectangular array of pixels. An image processor may be arranged to determine a plurality of secondary images from a primary image. Each secondary image may be formed by sampling (or sub sampling) the primary image using a respective regular array of sampling positions, as described herein. A hologram calculator may be arranged to determine a hologram of each secondary image. For example, the hologram calculator may calculate a hologram from each secondary image using a suitable algorithm as described herein. A display driver may be arranged to sequentially display each hologram in rapid succession on the spatial light modulator first and second times, and to illuminate each hologram, so as to reconstruct each secondary image from the respective hologram at a replay plane. In particular, each secondary image is reconstructed by forming an array of image pixels at the replay plane. As a result, a composite reconstruction substantially corresponding to the primary image is perceivable. The image pixels of the composite reconstruction are more closely packed in first and second orthogonal directions, thereby increasing image resolution. In addition, adjacent image pixels in the composite reconstruction are formed at different times, thereby reducing interpixel interference.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. In some embodiments, the light receiving surface is a diffuser surface or screen such as a diffuser. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affected by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focused at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

In some embodiments, the size (number of pixels in each direction) of the hologram is equal to the size of the spatial light modulator so that the hologram fills the spatial light modulator. That is, the hologram uses all the pixels of the spatial light modulator. In other embodiments, the hologram is smaller than the spatial light modulator. More specifically, the number of hologram pixels is less than the number of light-modulating pixels available on the spatial light modulator. In some of these other embodiments, part of the hologram (that is, a continuous subset of the pixels of the hologram) is repeated in the unused pixels. This technique may be referred to as "tiling" wherein the surface area of the spatial light modulator is divided up into a number of "tiles", each of which represents at least a subset of the hologram. Each tile is therefore of a smaller size than the spatial light modulator. In some embodiments, the technique of "tiling" is implemented to increase image quality. Specifically, some embodiments implement the technique of tiling to minimise the size of the image pixels whilst maximising the amount of signal content going into the holographic reconstruction. In some embodiments, the holographic pattern written to the spatial light modulator comprises at least one whole tile (that is, the complete hologram) and at least one fraction of a tile (that is, a continuous subset of pixels of the hologram).

In embodiments, only the primary replay field is utilised and system comprises physical blocks, such as baffles, arranged to restrict the propagation of the higher order replay fields through the system.

In embodiments, the holographic reconstruction is colour. In some embodiments, an approach known as spatially-separated colours, "SSC", is used to provide colour holographic reconstruction. In other embodiments, an approach known as frame sequential colour, "FSC", is used.

The method of SSC uses three spatially-separated arrays of light-modulating pixels for the three single-colour holograms. An advantage of the SSC method is that the image can be very bright because all three holographic reconstructions may be formed at the same time.

However, if due to space limitations, the three spatially-separated arrays of light-modulating pixels are provided on a common SLM, the quality of each single-colour image is sub-optimal because only a subset of the available light-modulating pixels is used for each colour. Accordingly, a relatively low-resolution colour image is provided.

The method of FSC can use all pixels of a common spatial light modulator to display the three single-colour holograms in sequence. The single-colour reconstructions are cycled (e.g. red, green, blue, red, green, blue, etc.) fast enough such that a human viewer perceives a polychromatic image from integration of the three single-colour images. An advantage of FSC is that the whole SLM is used for each colour. This means that the quality of the three colour images produced is optimal because all pixels of the SLM are used for each of the colour images. However, a disadvantage of the FSC method is that the brightness of the composite colour image is lower than with the SSC method—by a factor of about 3-because each single-colour illumination event can only occur for one third of the frame time. This drawback could potentially be addressed by overdriving the lasers, or by using more powerful lasers, but this requires more power resulting in higher costs and an increase in the size of the system.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A holographic system comprising:
   an image processor arranged to determine a plurality of secondary images from a primary image, each secondary image formed by sampling pixel values of the primary image at a regular array of sampling positions, wherein a first secondary image is formed using a regular array of first sampling positions and a second secondary image is formed using a regular array of second sampling positions, wherein the second sampling positions are interposed between the first sampling positions in a first direction; and
   one or more tangible, non-transitory computer-readable media comprising program instructions, wherein the program instructions, when executed by one or more processors of the holographic system, cause the holographic system to:
   determine a hologram of each secondary image; and cause display of each hologram in rapid succession on a display device so as to reconstruct each secondary image from the respective hologram such that a first array of image pixels, substantially corresponding to the primary image, is perceivable, wherein image pixels of the reconstruction of the second secondary image are interposed between image pixels of the reconstruction of the first secondary image in the first direction, wherein an aperture of the display device is orientated such that it is longer in a second direction than the first direction, wherein the second direction is orthogonal to the first direction, and wherein the image pixels formed to reconstruct each secondary image are more elongate and closely-packed in the first direction than the second direction; and cause display of each hologram for a second time in rapid succession with a first time so as to reconstruct each secondary image from the respective hologram such that a second array of the image pixels is perceivable.

2. The holographic system of claim 1, wherein the second array of the image pixels is translated in the second direction with respect to the first array of the image pixels in order that the second array of the image pixels interpose the first array of the image pixels in the second direction.

3. The holographic system of claim 1 wherein the program instructions, when executed by one or more processors of the holographic system, cause the holographic system to display each hologram for a second time with a grating function in the second direction so that the second array of the image pixels is translated in the second direction with respect to the first array of image pixels.

4. The holographic system of claim 1 wherein the first sampling positions are aligned with the second sampling positions in the second direction of the array such that image pixels of the reconstruction of the second secondary image are aligned with image pixels of the reconstruction of the first secondary image in the second direction.

5. The holographic system of claim 1 wherein the image processor is arranged to form a third secondary image using a regular array of third sampling positions and a fourth secondary image using a regular array of fourth sampling positions.

6. The holographic system of claim 5 wherein the fourth sampling positions are interposed between the third sampling positions in the first direction.

7. The holographic system of claim 6 wherein the program instructions, when executed by one or more processors of the holographic system, cause the holographic system to display a sequence of holograms corresponding to the first to fourth secondary images in rapid succession on the display device such that the first array of image pixels, substantially corresponding to the primary image, is perceivable, wherein image pixels of the reconstruction of the fourth secondary image are interposed between image pixels of the reconstruction of the third secondary image in the first direction.

8. The holographic system of claim 6 wherein each of the regular arrays of first to fourth sampling positions are different.

9. The holographic system of claim 1 wherein at least one of: (i) each secondary image comprises fewer pixels than the primary image, or (ii) each pixel of the primary image corresponds to only one secondary image such that the secondary images are combinable in order to fully form a composite representation of the primary image.

10. The holographic system of claim 1 wherein each hologram is displayed on the display device, and each displayed hologram is illuminated, in rapid succession such that the first array of the image pixels is formed on a display plane at substantially the same time or within an integration time of a human eye.

11. The holographic system of claim 10, wherein the display device is a spatial light modulator.

12. The holographic system of claim 11, wherein the display device is a liquid crystal on silicon (LCOS) spatial light modulator.

13. The holographic system of claim 1, wherein the aperture of the display device comprises a rectangular perimeter of a pixel array of the display device.

14. The holographic system of claim 1, wherein each regular array of sampling positions is a square array of sampling positions pixel such that each secondary image is square.

15. The holographic system of claim 1, wherein the array of image pixels has a high aspect ratio.

16. The holographic system of claim 15, wherein the aspect ratio is substantially 2:1.

17. The holographic system of claim 1, wherein the image processor is further arranged to receive a target image for projection and to form the primary image.

18. The holographic system of claim 17, wherein the primary image is an upscaled version of a target image.

19. A holographic system comprising:
a display device;
one or more processors; and
one or more tangible, non-transitory computer-readable media having program instructions stored therein, wherein the program instructions, when executed by the one or more processors, cause the holographic system to:
determine a plurality of secondary images from a primary image, each secondary image formed by sampling pixel values of the primary image at a regular array of sampling positions, wherein a first secondary image is formed using a regular array of first sampling positions and a second secondary image is formed using a regular array of second sampling positions, wherein the second sampling positions are interposed between the first sampling positions in a first direction of the array;
determine a hologram of each secondary image;
cause display of each hologram in rapid succession on the display device comprising a pixel array for a first time so as to reconstruct each secondary image from the respective hologram such that a first array of image pixels, substantially corresponding to the primary image, is perceivable, wherein image pixels of the reconstruction of the second secondary image are interposed between image pixels of the reconstruction of the first secondary image in the first direction;
cause display of each hologram in rapid succession on the display device for a second time, wherein the second time is immediately after the first time, so as to reconstruct each secondary image from the respective hologram such that a second array of image pixels is perceivable, wherein the second array of image pixels is translated in a second direction relative to the first array of images pixels; and
wherein an aperture of the display device is longer in the second direction than the first direction, wherein the second direction is orthogonal to the first direction, and wherein the image pixels formed to reconstruct each secondary image are more elongate and closely-packed in the first direction than the second direction.

20. A tangible, non-transitory computer-readable media comprising program instructions stored therein, wherein the program instructions, when executed by one or more processors, cause a holographic system to perform functions comprising:
- determining a plurality of secondary images from a primary image, each secondary image formed by sampling pixel values of the primary image at a regular array of sampling positions, wherein a first secondary image is formed using a regular array of first sampling positions and a second secondary image is formed using a regular array of second sampling positions, wherein the second sampling positions are interposed between the first sampling positions in a first direction;
- determining a hologram of each secondary image;
- causing a display device to display each hologram in rapid succession so as to reconstruct each secondary image from the respective hologram such that a first array of image pixels, substantially corresponding to the primary image, is perceivable, wherein image pixels of the reconstruction of the second secondary image are interposed between image pixels of the reconstruction of the first secondary image in the first direction;
- wherein an aperture of the display device is orientated such that it is longer in a second direction than the first direction, wherein the second direction is orthogonal to the first direction, and wherein the image pixels formed to reconstruct each secondary image are more elongate and closely-packed in the first direction than the second direction; and
- wherein causing a display device to display each hologram in rapid succession comprises comprising the display device to display each hologram for a second time in rapid succession with a first time so as to reconstruct each secondary image from the respective hologram such that a second array of the image pixels is perceivable.

* * * * *